G. W. DUNBAR, Dec'd, & G. H. & F. B. DUNBAR,
J. F. EMERSON, administrator.
PRESERVING SHRIMPS IN METAL CANS.
No. 9,957. Reissued Dec. 6, 1881.
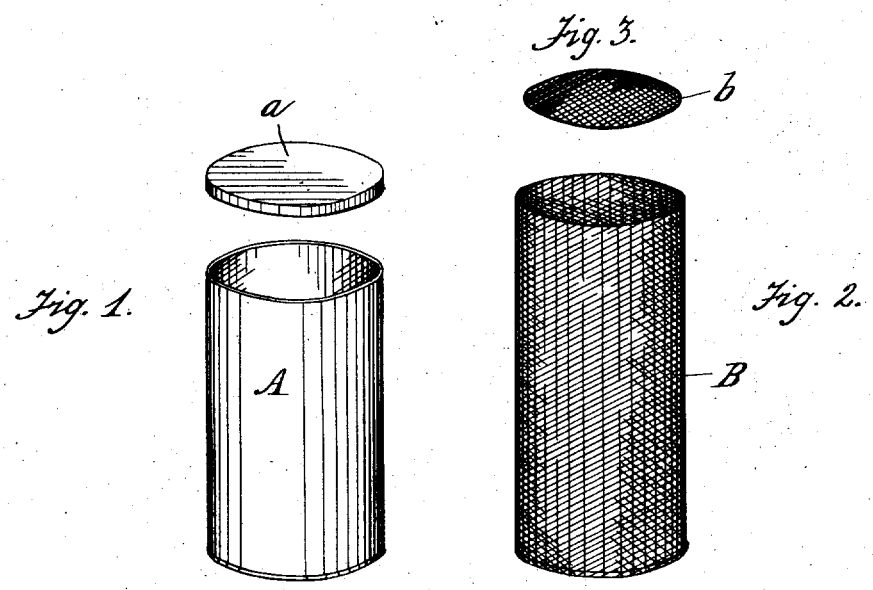
Witnesses:
H. G. Wadlin.
H. Climo
James F. Emerson, } Administrator of Estate of G. W. DUNBAR.
George H. Dunbar
Francis B. Dunbar } Surviving joint inventors.
by Wright & Brown Attys

UNITED STATES PATENT OFFICE.

JAMES F. EMERSON, (ADMINISTRATOR OF GEORGE W. DUNBAR, DECEASED,) OF WAKEFIELD, MASSACHUSETTS, AND GEORGE H. DUNBAR AND FRANCIS B. DUNBAR, BOTH OF NEW ORLEANS, LOUISIANA.

PRESERVING SHRIMPS IN METAL CANS.

SPECIFICATION forming part of Reissued Letters Patent No. 9,957, dated December 6, 1881.

Original No. 178,916, dated June 20, 1876. Application for reissue filed April 9, 1881.

*To all whom it may concern:*

Be it known that GEORGE W. DUNBAR, GEORGE H. DUNBAR, and FRANCIS B. DUNBAR, residents of the city of New Orleans and State of Louisiana, did, during the lifetime of said GEORGE W. DUNBAR, invent a certain new and useful Improvement in Methods of Preserving Shrimps in Metal Cans; and we do hereby declare the following to be a full, clear, and correct description of the same, reference being had to the annexed drawings, making a part of this specification.

The object of our present invention is to provide an improved method of preserving shrimps or prawns, and, indeed, all kinds of shell-fish, preventing their discoloration and insuring the retention of their original freshness and flavor.

In canning the shrimps or prawns we have found that direct contact of the shrimps with the can and the presence of free liquid or gravy in the shrimps, after they are placed in the can, are very objectionable for the following reasons:

First. The direct contact of the shrimps with the can causes, during the process of cooking and thereafter, a precipitation of black or dark matter which discolors the shrimps and detracts from their flavor and richness. This precipitation is believed to be caused by the action of sulphur contained in the shrimps on the metal of the can.

Second. Free liquid or gravy in the shrimps constitutes a vehicle or medium to diffuse the dark precipitate or coloring-matter throughout the entire mass of shrimps in the can, so that all portions of the contents of the can are equally affected and discolored.

Our invention has for its object to obviate the above-named objections; and it consists in first providing the can with a lining to prevent direct contact of the shrimps with the metal, and, second, placing the shrimps in the lined can while they are in a dry or moist condition and devoid of free liquid or gravy, sealing the can without adding any liquid to its contents, and cooking the contents of the can after sealing, all of which we will now proceed to describe.

In the accompanying drawings is illustrated, at Figure 1, a metallic can, such as is ordinarily used for articles of food which are offered to the trade in a canned state. Fig. 2 is the lining, which we propose usually to make in the form of a cylindrical bag or sack, the diameter of which, when filled, is to be such as will permit of its fitting snugly within the can. Fig. 3 represents a circular mouth-piece for said lining.

A is the metallic can. *a* its lid or cover. B is the lining, constructed, preferably, of cotton or muslin. Material of the cheapest and most inferior quality may be used, as the sole object of its use is to prevent the article to be preserved from coming in direct contact with the surface of the can, which contact with the metal in the case of the shrimp causes, as before stated, during the process of boiling, and all along thereafter until the can is opened, a profuse precipitation of a black substance generally believed to be sulphur, and which supposition is based upon the fact that the shrimp is said to possess a much larger proportion of sulphur than any other shell-fish.

*b*, Fig. 3, is a circular piece cut out of material similar to that of which the bag B is made, and which is inserted within the mouth of the latter after the same is filled with the fish or other article to be preserved.

Such a can and lining as herein described are admirably adapted for the purpose attained by our present invention; but, as before stated, there is nothing arbitrary about the peculiar form and construction of the textile-fabric lining, as other forms and arrangements might be substituted therefor without in any manner altering the principle of the invention.

In canning the shrimps we employ the following process: The shell having been removed from the shrimp in the usual manner, the fish is thrown into salt-water of about six degrees, and there remains for an hour, (more or less,) and from thence to kettles filled with water and brought to a boiling-heat, after which they are placed on drippers and cooled and thoroughly rinsed with fresh cold water, from which, so soon as thoroughly dripped and in a moist condition, and without the addition of any salted or otherwise prepared liquid, they are placed in the sack B, the same having been previously arranged in the can A. So soon as the sack is filled, the mouth thereof being properly secured, the lid or head *a* is placed in position on the can A and immediately sealed. The cans are then subjected to a steam bath, or placed in kettles containing boiling water, and boiled for two hours at the highest temperature attainable, and which completes the process.

What we claim as new, and desire to secure by Letters Patent, is—

As an improvement in the art of preserving shrimps in metal cans, the mode of preventing the discoloration of the shrimps which consists in interposing between the metal can and the shrimps an enveloping material for the shrimps which is not itself capable of discoloring the shrimps, and then sealing the can and subjecting the same and its contents to a boiling process, substantially as described.

JAMES F. EMERSON,
*Administrator of the estate of Geo. W. Dunbar, deceased.*

GEO. H. DUNBAR,
F. B. DUNBAR,
*Surviving joint inventors.*

Witnesses to signature of James F. Emerson:

H. G. WADLIN,
C. F. BROWN.

Witnesses to signatures of Geo. H. Dunbar and F. B. Dunbar:

D. I. DOWERS
P. A. ORY.